United States Patent
Fujikawa et al.

(12) 
(10) Patent No.: US 6,735,762 B2
(45) Date of Patent: May 11, 2004

(54) RECORD MEDIUM AND METHOD FOR ANALYZING A SOURCE FILE

(75) Inventors: Ryoko Fujikawa, Kawasaki (JP); Yasuyuki Fujikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 451 days.

(21) Appl. No.: 09/834,890

(22) Filed: Apr. 16, 2001

(65) Prior Publication Data

US 2002/0092001 A1 Jul. 11, 2002

(30) Foreign Application Priority Data

Nov. 24, 2000 (JP) .......................... 2000-356878

(51) Int. Cl.$^7$ ................................... G06F 9/45
(52) U.S. Cl. ........................................ 717/141
(58) Field of Search ......................... 717/141–161, 717/131–133

(56) References Cited

U.S. PATENT DOCUMENTS

| | | | | |
|---|---|---|---|---|
| 5,689,711 A | * | 11/1997 | Bardasz et al. | 717/105 |
| 5,828,886 A | * | 10/1998 | Hayashi | 717/159 |
| 5,956,510 A | * | 9/1999 | Nicholas | 717/137 |
| 6,243,863 B1 | * | 6/2001 | Kothari et al. | 717/149 |

FOREIGN PATENT DOCUMENTS

JP A-07311683 A 11/1995

OTHER PUBLICATIONS

Zaafrani et al. Expressing Cross–Loop Dependencies Through Hyperplane Data Dependence Analysis. IEEE. 1994. pp. 508–517.*

Chu et al. Software Restructuring by Enforcing Localization and Information Hiding. IEEE. 1992. pp. 165–172.*

* cited by examiner

Primary Examiner—Wei Zhen
(74) Attorney, Agent, or Firm—Staas & Halsey LLP

(57) ABSTRACT

A source file analyzing method for specifying a class and its member influenced by a change made in a predetermined class included in a source file described in an object-oriented language. An inputter inputs a source file to be analyzed and provides it to a reference relationship examiner. The reference relationship examiner examines the reference relationships of classes and methods included in the classes, including class definitions, class member definition information regarding class member definitions, and class member content information regarding the contents of class members, creates reference relationship information indicating inheritance relationships among classes and class call relationships, and provides them to an influenced class specifier. The influenced class specifier accepts the name of a changed class entered and specifies an influenced class by referring to the class definition information, class member definition information, class member content information, and reference relationship information.

12 Claims, 32 Drawing Sheets

```
Package co.jp.xxx.aaa
Public class ClassA{
    String x;
    public void methodA1(String a){
        x=a;
    }
    public void display(){
        System.out.println("x="+x);
    }
}
```

FIG. 7

```
package co.jp.xxx.aaa

Public class ClassB extends ClassA{ private ClassDD d;

private ClassEE e;

public bool methodB1(String a){ try{ super.methodA1("call from ClassB");

super.displayx();

e.methodEE();

}catch(BBException e){

System.out.println("error"+e);

| CLASS ID | CLASS NAME | PACKAGE NAME | PARENT CLASS NAME | PARENT CLASS ID | SCOPE |
|---|---|---|---|---|---|
| 1 | String | | | | public |
| 11 | ClassA | co.jp.xxx.aaa.ClassA | NONE | | public |
| 22 | ClassB | co.jp.xxx.aaa.ClassB | ClassA | | public |
| 33 | ClassC | co.jp.xxx.aaa.ClassC | ClassA | | public |
| 44 | ClassD | co.jp.xxx.aaa.ClassD | ClassA | | public |
| 55 | ClassE | co.jp.xxx.aaa.ClassE | ClassB | | public |
| 111 | ClassAA | co.jp.xxx.aaa.ClassAA | NONEv | | public |
| 112 | ClassBB | co.jp.xxx.aaa.ClassBB | ClassAA | | public |
| 113 | ClassCC | co.jp.xxx.aaa.ClassCC | ClassAA | | public |
| 114 | ClassDD | co.jp.xxx.aaa.ClassDDA | ClassAA | | public |
| 115 | ClassEE | co.jp.xxx.aaa.ClassEE | ClassBB | | public |
| 1111 | BBException | co.jp.xxx.aaa.common.BBException | Exception | | public |

FIG. 10

| CLASS MEMBER ID | CLASS ID | TYPE | NAME | USE CLASS NAME | USE CLASS ID |
|---|---|---|---|---|---|
| 1121 | 11 | VARIABLE | x | String | |
| 1122 | 22 | VARIABLE | e | ClassEE | |

FIG. 11

| CLASS MEMBER ID | CLASS ID | TYPE | NAME | RETURNED VALUE CLASS NAME | RETURNED VALUE CLASS ID | PARAMETER NAME | PARAMETER CLASS NAME | PARAMETER CLASS ID |
|---|---|---|---|---|---|---|---|---|
| 1122 | 11 | METHOD | methodA1 | NONE | | a | String | |
| 1133 | 22 | METHOD | methodB1 | bool | | a | String | |

FIG. 12

| CLASS MEMBER ID | CLASS ID | TYPE | CALL NAME | USE CLASS NAME | USE CLASS ID |
|---|---|---|---|---|---|
| 1133 | 22 | METHOD CALL | super.methodA1("call from ClassB") | NONE | |

FIG. 13

| CLASS MEMBER ID | CLASS ID | TYPE | CALL NAME | PARAMETER NAME | EXCEPTION CLASS NAME | EXCEPTION CLASS ID |
|---|---|---|---|---|---|---|
| 1133 | 11 | EXCEPTION | BBException | e | BBException | |

FIG. 14

| CLASS ID | CLASS NAME | PACKAGE NAME | PARENT CLASS NAME | PARENT CLASS ID | SCOPE |
|---|---|---|---|---|---|
| 1 | String | | | | public |
| 2 | bool | | | | public |
| 11 | ClassA | co.jp.xxx.aaa.ClassA | NONE | | public |
| 22 | ClassB | co.jp.xxx.aaa.ClassB | ClassA | 11 | public |
| 33 | ClassC | co.jp.xxx.aaa.ClassC | ClassA | 11 | public |
| 44 | ClassD | co.jp.xxx.aaa.ClassD | ClassA | 11 | public |
| 55 | ClassE | co.jp.xxx.aaa.ClassE | ClassB | 22 | public |
| 111 | ClassAA | co.jp.xxx.aaa.ClassAA | NONE | | public |
| 112 | ClassBB | co.jp.xxx.aaa.ClassBB | ClassAA | 111 | public |
| 113 | ClassCC | co.jp.xxx.aaa.ClassCC | ClassAA | 111 | public |
| 114 | ClassDD | co.jp.xxx.aaa.ClassDDA | ClassAA | 111 | public |
| 115 | ClassEE | co.jp.xxx.aaa.ClassEE | ClassBB | 112 | public |
| 1111 | BBException | co.jp.xxx.aaa.common.BBException | Exception | 333 | public |

FIG. 15

| CLASS MEMBER ID | CLASS ID | TYPE | NAME | USE CLASS NAME | USE CLASS ID |
|---|---|---|---|---|---|
| 1121 | 11 | VARIABLE | x | String | 1 |
| 1122 | 22 | VARIABLE | e | ClassEE | 115 |

| CLASS MEMBER ID | CLASS ID | TYPE | NAME | RETURNED VALUE CLASS NAME | RETURNED VALUE CLASS ID | PARAMETER NAME | PARAMETER CLASS NAME | PARAMETER CLASS ID |
|---|---|---|---|---|---|---|---|---|
| 1122 | 11 | METHOD | methodA1 | NONE | | | | |
| 1133 | 22 | METHOD | methodB1 | bool | 2 | a | String | 1 |
| | | | | | | a | String | 1 |

| CLASS MEMBER ID | CLASS ID | TYPE | CALL NAME | USE CLASS NAME | USE CLASS ID |
|---|---|---|---|---|---|
| 1133 | 22 | METHOD CALL | super.methodA1("call from ClassB") | ClassA | 11 |

FIG. 18

| CLASS MEMBER ID | CLASS ID | TYPE | CALL NAME | PARAMETER NAME | EXCEPTION CLASS NAME | EXCEPTION CLASS ID |
|---|---|---|---|---|---|---|
| 1133 | 11 | EXCEPTION | BBException | e | BBException | 1111 |

FIG. 19

| USE TYPE | USE CLASS | USE MEMBER | REFERENCE CLASS | USE NAME |
|---|---|---|---|---|
| INHERITANCE | 22 | | 11 | ClassA |
| VARIABLE | 22 | 1122 | 115 | e |
| METHOD PARAMETER | 22 | | | |
| METHOD RETURNED VALUE | 22 | 1133 | 2 | bool |
| METHOD CALL WITHIN METHOD | 22 | 1133 | 11 | super.methodA1("call from ClassB") |
| "catch" EXCEPTION WITHIN METHOD | 22 | 1133 | 1111 | e |

FIG. 20

DESIGNATE DETAILED SEARCH CONDITIONS

| | TYPE | NAME OF TARGET CLASS FOR SEARCH | TYPE | PROPERTY NAME |
|---|---|---|---|---|
| ✓ | public | ClassEE | METHOD | methodEE() |
| | public | ClassEE | METHOD | method1EE() |

SEACH  CANCEL  HELP

FIG. 24

RECORD MEDIUM AND METHOD FOR ANALYZING A SOURCE FILE

BACKGROUND OF THE INVENTION (1) Field of the Invention

This invention relates to a record medium and a method for analyzing a source file and, more particularly, to a computer-readable record medium which stores a program for having a computer perform the process of analyzing a source file described in an object-oriented language and such a source file analyzing method.

(2) Description of the Related Art

Conventionally, when a source file described in a procedural language, such as COBOL (common business oriented language), is, for example, debugged or updated, program portions affected by the debug or update are specified and care is taken so that these portions do not malfunction.

FIGS. 32(A) and 32(B) are views for describing an influence search function called cross reference which has conventionally been used to specify a portion influenced by a change made in a source file. FIG. 32(A) shows a source file to be changed. In this example, program A and program C use COPY Al and subroutine B (PROGRAM SUB B).

Making an influence search on this source file will produce results like the ones shown in FIG. 32(B). In this example, each column shows the type of a program, each row shows COPY used, and fields where the use relationship exists are marked with "o" By using such a table, it can be understood immediately that, for example, program A and program C use COPY A1.

With such a procedural language, the structure of a main program calling a common function (subroutine or component, for example) is clear and the uniqueness of a call name is guaranteed. The influence of a change therefore can be specified on the basis of one-to-one cross reference.

With object-oriented languages, being the mainstream in recent years, however, a program is defined as a class having an attribute (data) and operation (method), is substantiated as an object on a computer, and operates by exchanging messages with other objects.

With object-oriented languages, a child class (subclass) can inherit an attribute and operation from its parent class (superclass) by inheritance. In such a mechanism, when a class is changed, it is necessary to examine the reference situation not only for that child class but also for the lower classes (grandchild class, great-grandchild class, and so forth). This is not a one-to-one correspondence, so it is difficult to grasp the scope of the influence.

Furthermore, object-oriented languages enable what is called "overloading," that is to say, to multiply define classes (or methods) of the same name the arguments of which differ in number or type. Moreover, they enable what is called "overriding," that is to say, to redefine a method or member variable for a superclass in its subclass. Under these circumstances operation names (method names) do not necessarily correspond to the contents of processes on a one-to-one basis. Therefore, it is difficult to specify a reference relationship only by an operation name.

Conventionally, owing to these problems peculiar to object-oriented languages, relationships among classes or the use relationships of classes have been examined manually by reference to design documents etc. This involves a great deal of labor and increases the possibility of a miss caused by, for example, carelessness. As a result, debugging a program takes much time.

In addition, it is difficult to examine reference relationships among classes, so an unused class may remain after a program is changed. In such a case, resources are consumed unnecessarily.

SUMMARY OF THE INVENTION

In order to address such problems, the present invention was made. In other words, an object of the present invention is to provide a source file analyzing method that can easily make an influence search in an object-oriented language and a record medium on which a program for having a computer use such a method is recorded.

In order to achieve the above object, a source file analyzing method for analyzing a source file described in an object-oriented language is provided. This source file analyzing method comprises an inputting step for inputting a source file to be analyzed, a reference relationship examining step for examining the reference relationships of classes included in the source file input by the inputting step, and an influenced class specifying step for specifying a class influenced by a change made in a predetermined class on the basis of results obtained through examinations by the reference relationship examining step.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a view showing a source file of "ClassA."

FIG. 8 is a view showing a source file of "ClassB."

FIG. 10 is a view showing an example of a class table which stores class information.

FIG. 11 is a view showing an example of a class member table which stores class member information regarding variables.

FIG. 12 is a view showing an example of a class member table which stores class member information regarding methods.

FIG. 13 is a view showing an example of a class member content table which stores class member content information regarding method calls.

FIG. 14 is a view showing an example of a class member content table which stores class member content information regarding exception catches.

FIG. 15 is a view showing an example of how to store appropriate data in the Parent Class ID fields of the class table shown in FIG. 10.

FIG. 16 is a view showing an example of how to store appropriate data in the Use Class ID fields of the class member table regarding variables shown in FIG. 11.

FIG. 17 is a view showing an example of how to store appropriate data in the Returned Value Class ID and Parameter Class ID fields of the class member table regarding methods shown in FIG. 12.

FIG. 18 is a view showing an example of how to store appropriate data in the Use Class ID field of the class member content table regarding method calls shown in FIG. 13.

FIG. 19 is a view showing an example of how to store appropriate data in the Exception Class ID field of the class member content table regarding exception catches shown in FIG. 14.

FIG. 20 is a view showing an example of class reference information created for "ClassB."

FIG. 24 is an example of a screen displayed when, in a display area 70g on the screen shown in FIG. 21, "ClassEE" is selected and a button 70c is operated.

FIG. 27 is an example of a screen displayed when unused resources are searched for.

FIG. 31 is an example of a flowchart performed when unused resources are searched for.

DESCRIPTION OF THE PREFERRED EMBODIMENTS

An embodiment of the present invention will now be described with reference to the drawings.

Figure 1:
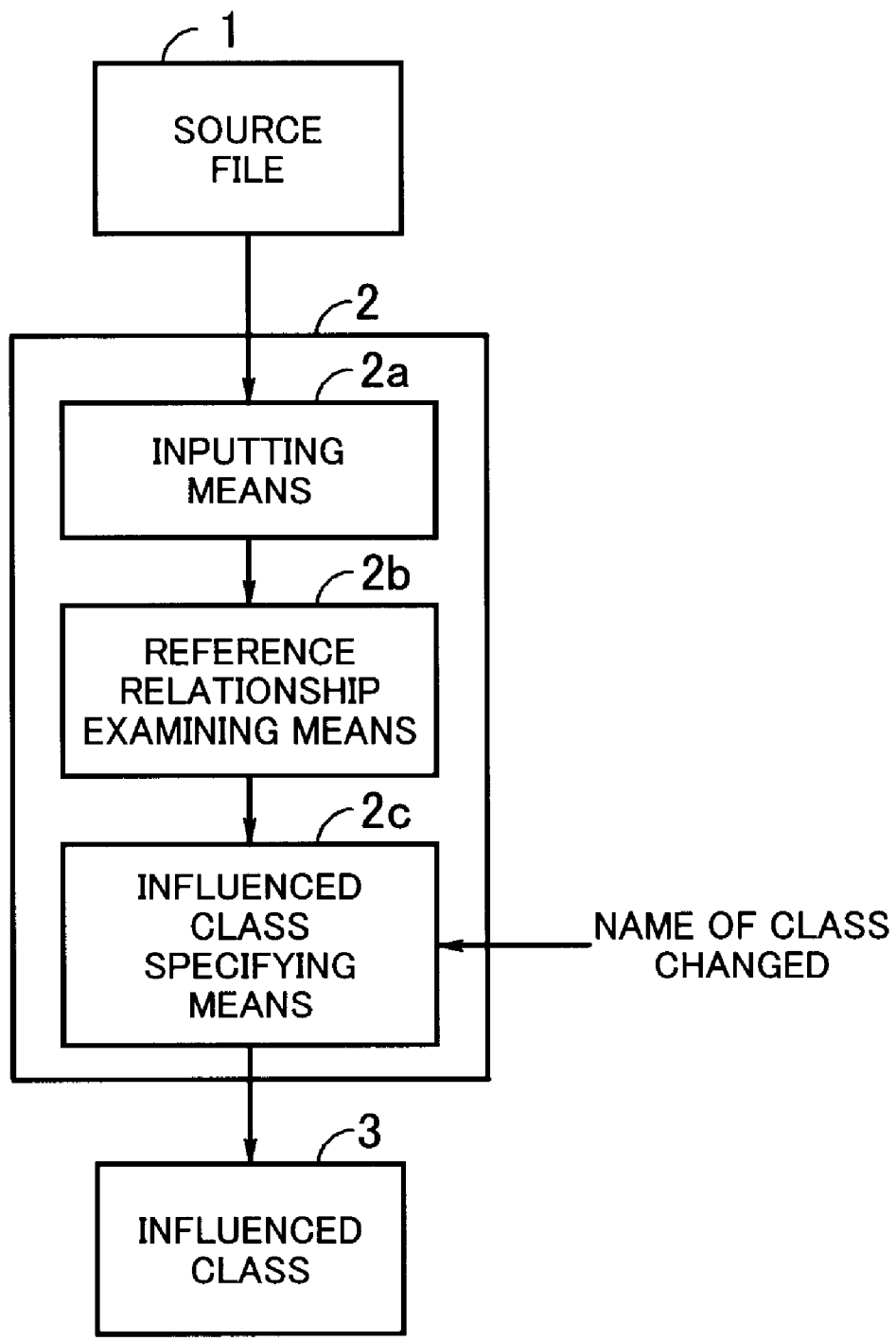
FIG. 1 is a view for describing the operating principle of the present invention.

FIG. 1 is a view for describing the operating principle of a source file analyzing apparatus using a source file analyzing method according to the present invention.

As shown in FIG. 1, a source file analyzing apparatus 2 inputs a source file to be analyzed, inputs the name of a class to be changed, specifies a class influenced by the change, and outputs it as an analysis result.

The source file analyzing apparatus 2 comprises inputting means 2a, reference relationship examining means 2b, and influenced class specifying means 2c.

The inputting means 2a inputs a source file 1 to be analyzed.

The reference relationship examining means 2b examines the reference relationships of classes included in a source file input by the inputting means 2a.

The influenced class specifying means 2c specifies a class influenced by a change made in a predetermined class on the basis of the results of examinations by the reference relationship examining means 2b and outputs it as an influenced class 3.

Now, operation in FIG. 1 will be described.

The inputting means 2a inputs the source file 1 to be analyzed and provides it to the reference relationship examining means 2b.

The reference relationship examining means 2b examines the reference relationships of classes and members included in them. To be concrete, the reference relationship examining means 2b creates class information regarding definitions for classes, class member information regarding definitions for class members, class member content information regarding the contents of class members, and class reference information indicating inheritance relationships among classes and the call relationships of classes and provides them to the influenced class specifying means 2c.

As an example, it is assumed that "ClassB" inherits from "ClassA," that "ClassC" refers to method AA of "ClassA," and that "ClassD" instantiates "ClassA" and refers to the instance. Then "ClassB," "ClassC," and "ClassD" each have a reference relationship with "ClassA." The reference relationship examining means 2b specifies these reference relationships to create class reference information and creates class information, class member information, and class member content information regarding each of "ClassA," "ClassB," "ClassC," and "ClassD."

The influenced class specifying means 2c inputs a changed class, refers to class information, class member information, class member content information, and reference relationship information, being the results of examinations by the reference relationship examining means 2b, specifies subclasses and methods which have a reference relationship with the changed class, and outputs them as influenced classes 3.

In the above example, if "ClassA" is designated as a changed class, then "ClassB," "ClassC," and "ClassD," which belong to lower classes, will be specified as influenced classes. As a result, other classes and members influenced by a change made in "ClassA" can be specified.

An embodiment of the present invention will now be described.

Figure 2:
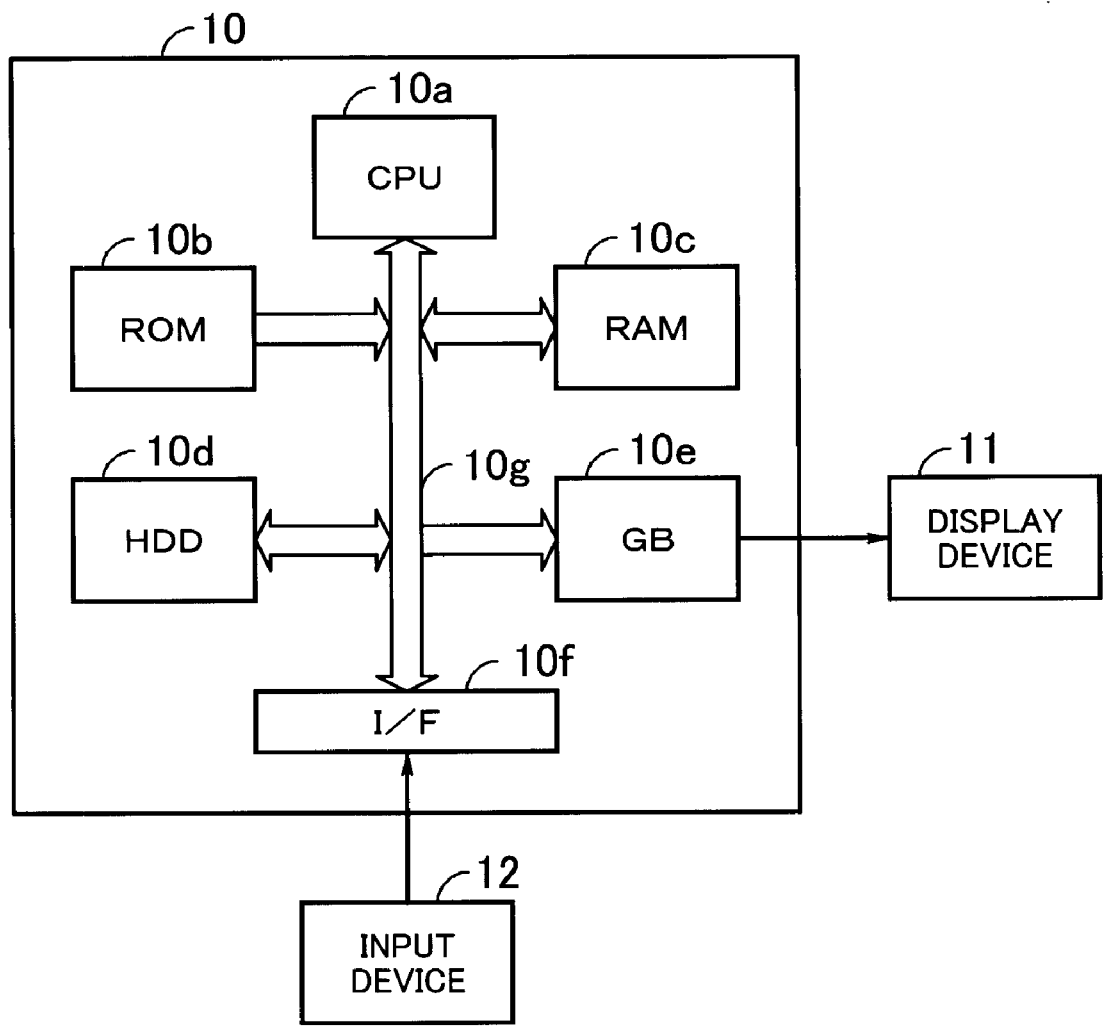
FIG. 2 is a view showing the configuration of an embodiment of the present invention.

FIG. 2 is a block diagram showing the configuration of an embodiment of a source file analyzing apparatus using a source file analyzing method according to the present invention. As shown in FIG. 2, a source file analyzing apparatus 10 comprises a central processing unit (CPU) 10a, a read only memory (ROM) 10b, a random access memory (RAM) 10c, a hard disk drive (HDD) 10d, a graphical board (GB) 10e, an interface (I/F) 10f, and a bus 10g. Furthermore, a display device 11 and an input device 12 are externally connected to the source file analyzing apparatus 10.

The CPU 10a controls the whole apparatus and performs various operation processes, in compliance with programs stored in the HDD 10d.

The ROM 10b stores basic programs executed by the CPU 10a and data.

The RAM 10c temporarily stores programs being executed by the CPU 10a and data being operated by the CPU 10a.

The HDD 10d stores an operating system (OS), being a basic program for managing the whole apparatus, application programs for analyzing a source file, a source program to be analyzed, and data, being analysis results.

The GB 10e performs a drawing process in accordance with a drawing command provided from the CPU 10a, converts image data obtained to image signals, and outputs them.

The I/F 10f converts the format of data provided from the input device 12 to the one used within the apparatus.

The bus log electrically connects the CPU 10a, the ROM 10b, the RAM 10c, the HDD 10d, the GB 10e, and the I/F 10f with one another so that they can exchange data.

The display device 11 consists of, for example, a cathode ray tube (CRT) monitor and displays image signals output from the GB 10e.

The input device 12 consists of, for example, a keyboard and mouse, creates data in response to a user's operation, and outputs it.

When a source file is analyzed by the source file analyzing apparatus 10, an OS stored in the HDD 10d is started and application programs for realizing a source file analyzing method are executed under its control.

Figure 3:
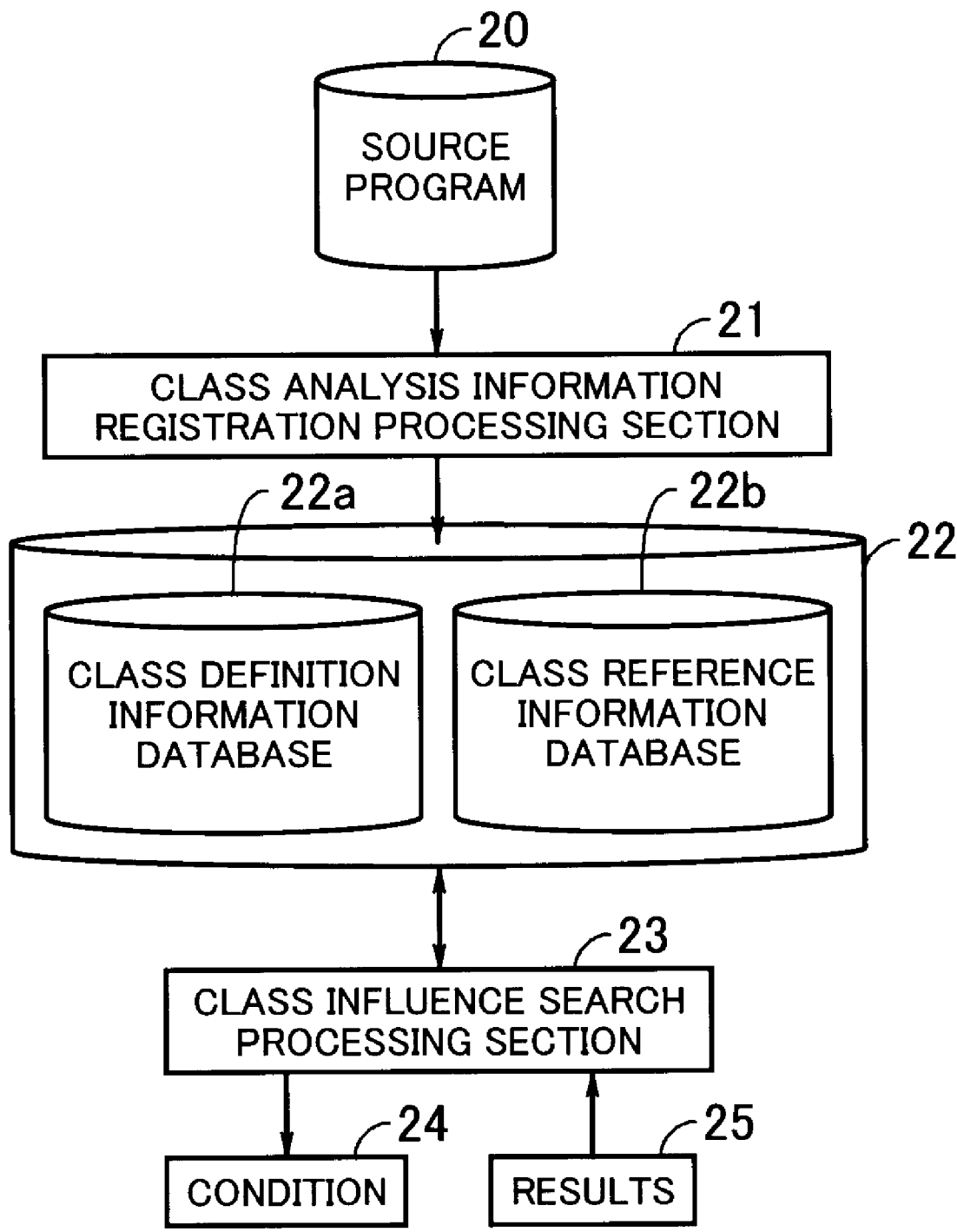
FIG. 3 is a view for describing functional blocks formed when application programs for realizing a source file analyzing method are executed.

FIG. 3 is a view for describing functional blocks formed when application programs for realizing a source file analyzing method are executed. In FIG. 3, a source program 20 is a program to be analyzed and is stored in the HDD 10d. This program is described in an object-oriented language, such as JAVA (trademark).

A class analysis information registration processing section 21 performs an analysis process on the source program 20 and registers analysis information created as a result of the analysis with a database 22.

The database 22 consists of a class definition information database 22a which stores information regarding definitions for classes and a class reference information database 22b which stores information regarding the reference relationships of classes.

Figure 4:
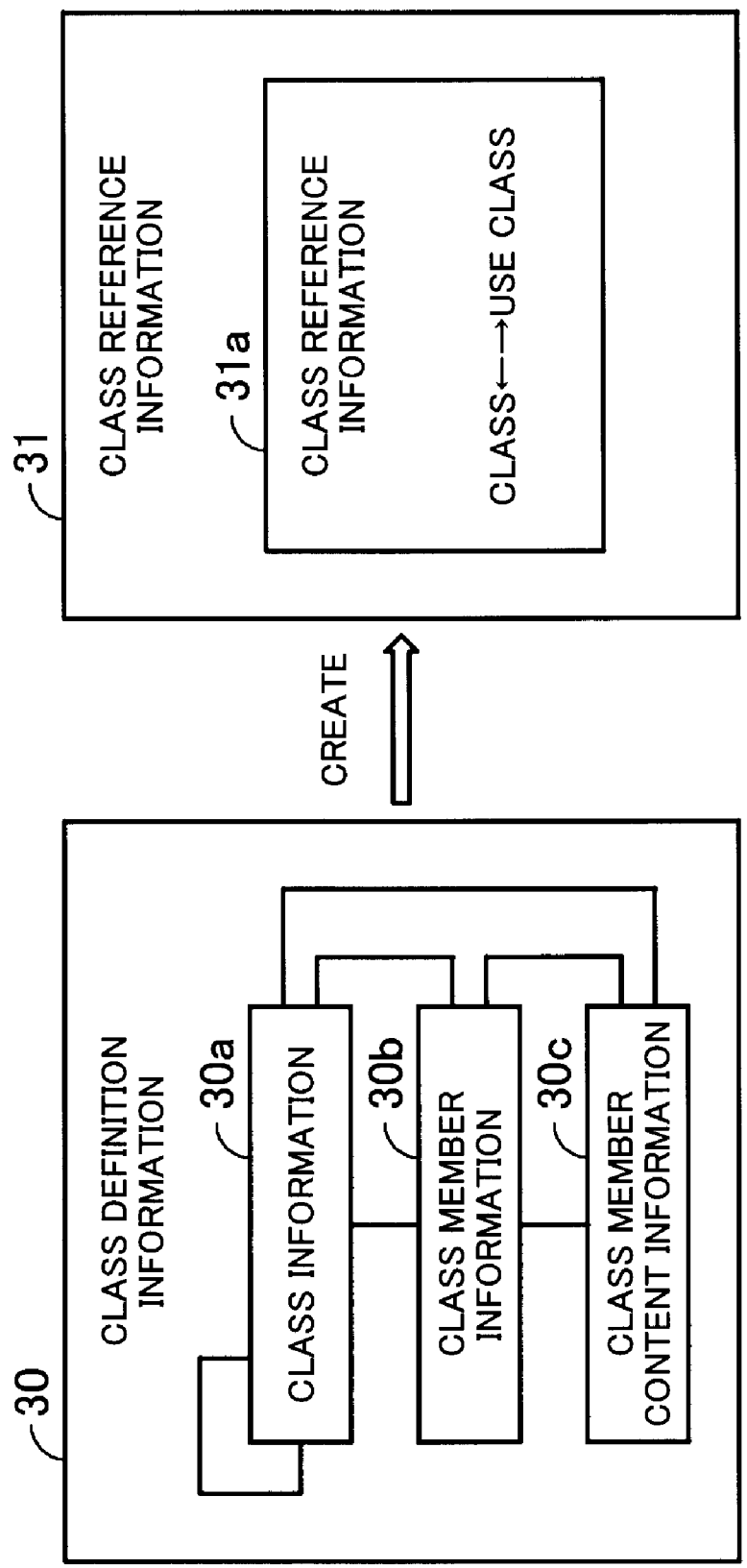
FIG. 4 is a view showing the configuration of class definition information.

As shown in FIG. 4, class definition information 30 consists of class information 30a indicating definitions for classes, class member information 30b indicating members included in classes, and class member content information 30c indicating the contents of class members.

As shown in FIG. 4 also, class reference information 31 consists of class reference information 31a indicating reference relationships between classes and use classes.

Figure 5:
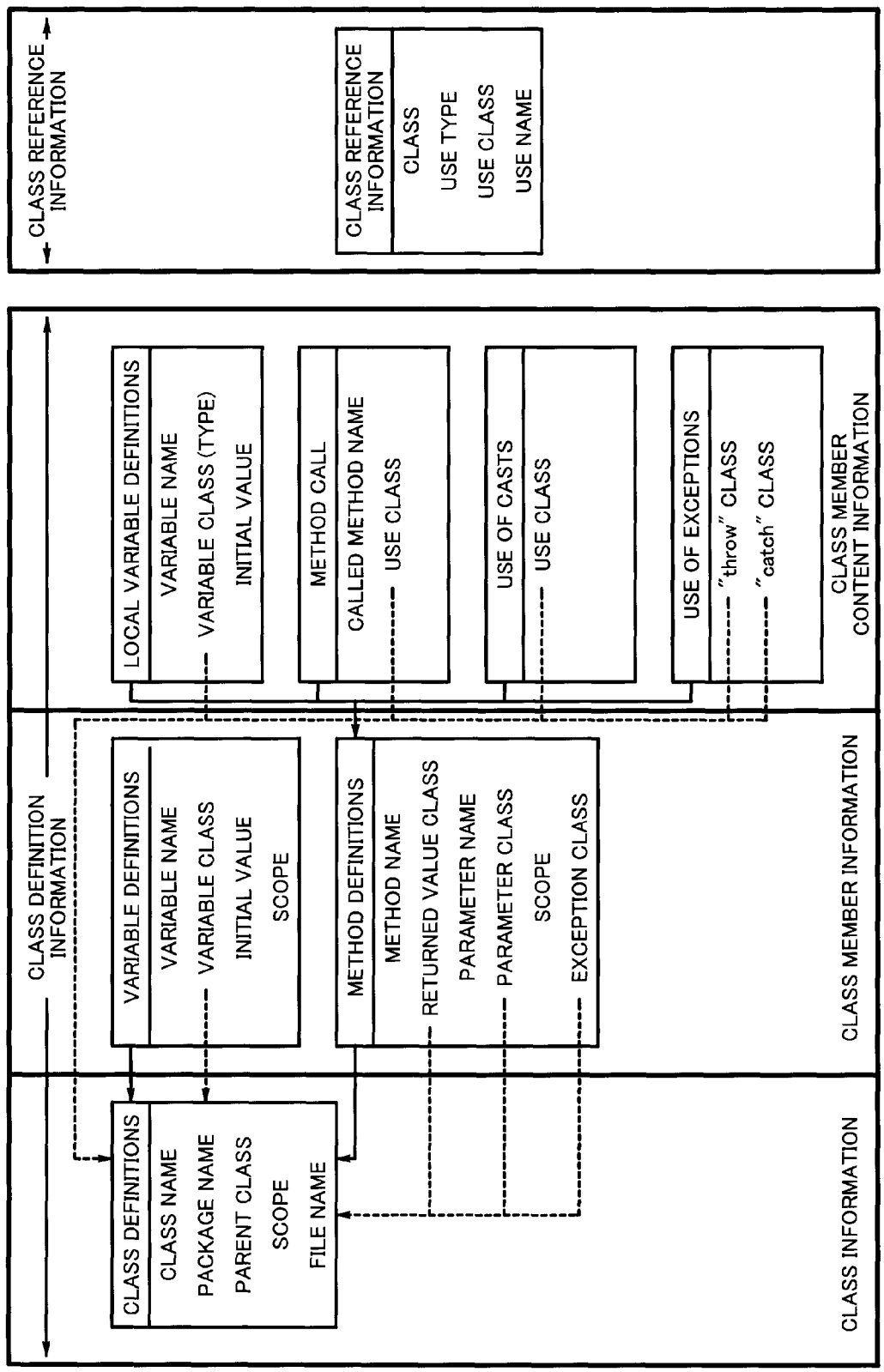
FIG. 5 is a view showing the details of class definition information and class reference information.

FIG. 5 is a view showing the details of class definition information and class reference information. As shown in FIG. 5, class information possesses class definitions each consisting of a class name, a package name, a parent class, scope, and a file name.

Class member information possesses variable definitions each consisting of a variable name, a variable class, an initial value, and scope and method definitions each consisting of a method name, a returned value class, a parameter name, a parameter class, scope, and an exception class.

Class member content information possesses local variable definitions each consisting of a variable name, a variable class, and an initial value, method calls each consisting of a called method name and a use class, use of casts consisting of a use class, and use of exceptions consisting of the "throw" class and "catch" class.

Class reference information possesses classes, types used, use classes, and use names.

But to return to FIG. 3, a class influence search processing section 23 searches the database 22 for classes which meet a condition 24 input, and outputs results 25 obtained.

Now, operation in the above embodiment will be described concretely.

Figure 6:
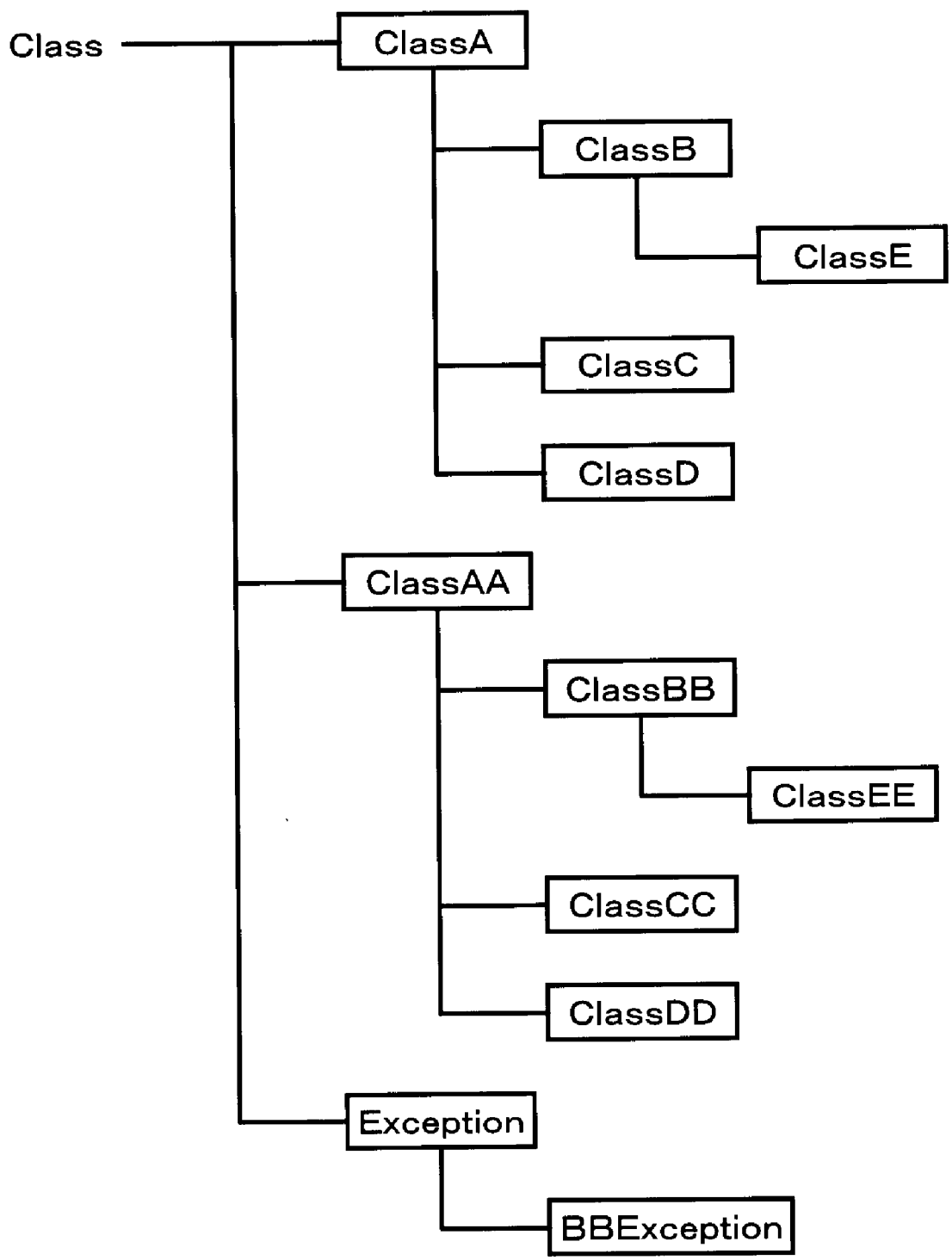
FIG. 6 is a view showing the hierarchical structure of classes included in a source file to be analyzed in this embodiment.

FIG. 6 is a view showing an example of the hierarchical structure of classes included in a source file to be analyzed in this embodiment. In this example, there are "ClassA," "ClassAA," and "Exception" as the highest classes. "ClassB," "ClassC," and "ClassD" are subordinate to "ClassA" and "ClassE" is subordinate to "ClassB."

Moreover, "ClassBB," "ClassCC," and "ClassDD" are subordinate to "ClassAA" and "ClassEE" is subordinate to "ClassBB."

In addition, "BBException" is subordinate to "Exception."

FIG. 7 is a view showing an example of a source file of "ClassA." In this example, the package name "Package co.jp.xxx.aaa" is described in the first line. Specific definitions for "ClassA" are described from the second line. That is to say, the string variable x is declared in the third line and the "public" method "methodA1" without a returned value (of the type "void") is defined in the fourth through sixth lines. Furthermore, the "public" method "display" without a returned value is defined in the seventh through ninth lines.

FIG. 8 is a view showing an example of a source file of "ClassB." In this example, the package name "Package co.jp.xxx.aaa" is described in the first line. Specific definitions for "ClassB" are described from the second line. That is to say, the second line declares that "ClassB" inherits from ("extends") "ClassA." The object "d" of "ClassDD" is created in the third line. The object "e" of "ClassEE" is created in the fourth line. The "public" method "methodB1" with data of the Boolean type ("bool") as a returned value is defined in the fifth through thirteenth lines. The main process for "methodB1" is performed in the sixth through ninth lines. That is to say, the methods "methodA1" and "displayx" of the superclass "ClassA" and the method "methodEE" of the object "e" are called.

Exception handling is performed in the tenth through twelfth lines when an exception, such as an error, occurs in the process in the sixth through ninth lines. The tenth through twelfth lines indicate that an error occurred, and call a method for displaying its error code.

In order to specify a class influenced by a change made in a predetermined class included in a source file like the ones described above, a class to be analyzed must first be designated. In this embodiment, a desired class is selected from a screen 40 shown in FIG. 9 as a method for doing so.

On the screen 40, a display area 40a where an object of analysis is displayed, a text box 40b for designating a database with which data, being analysis results, is registered, an indicator 40c which indicates the progress of registration, and various buttons 40d through 40h are displayed.

In the display area 40a, classes selected as objects of analysis are listed.

In the text box 40b, the name of a database with which class definition information obtained as a result of an analysis and class reference information are registered is entered.

In the indicator 40c, the progress of an analyzing process which has been started is displayed.

The button 40d is operated to add a folder which includes a class to be analyzed. The button 40e is operated to add a file which includes a class to be analyzed. The button 40f is operated to remove an unnecessary file or folder.

The button 40g is operated to refer to the existing folder and file names in the case of entering a database name.

The button 40h is operated to analyze a target class and register the results, on the basis of contents entered.

On the screen 40, a folder or file to be analyzed is selected by referring to contents displayed in the display area 40a and by operating the buttons 40d through 40f. Then the Refer button 40g is operated properly, the name of a database with which data as analysis results is registered is entered in the text box 40b, and the Start Registration button 40h is operated. By doing so, the class analysis information registration processing section 21 reads out a designated file from a designated folder and performs an analyzing process. In that case, the progress of a process is displayed in the indicator 40c.

The class analysis information registration processing section 21 reads designated files one by one and parses them. For example, if the source file shown in FIG. 7 is analyzed, then the following information will be extracted as class definition information.

(1) Class Information
Class name: ClassA
Class ID: 11 (automatically selected unique number)
Parent class: none
Scope: public
Package name: co.jp.xxx.aaa.ClassA
(2) Class Member Information
Variable: x
　Class member ID: 1111 (automatically selected unique number)
　Variable name: x
　Variable class: String
Method: methodA1
　Class member ID: 1112 (automatically selected unique number)
　Method name: methodA1
　Method returned value class: none
　Method parameter name: a
　Method parameter class: String If the source file shown in FIG. 8 is analyzed, then the following information will be extracted as class definition information.

(1) Class Information
Class name: ClassB
Class ID: 22 (automatically selected unique number)
Parent class: ClassA
Scope: public
Package name: co.jp.xxx.aaa.ClassB
(2) Class Member Information
Variable: e
　Class member ID: 1121 (automatically selected unique number)
　Variable name: e
　Variable class: ClassEE
Method: methodB1
　Class member ID: 1122 (automatically selected unique number)
　Method name: methodB1
　Method returned value class: bool
　Method parameter name: none
　Method parameter class: none
(3) Class Member Content Table
Method: methodB1
Example of information stored regarding a method call:
　Class member content ID: 3322 (automatically selected unique number)
　Class member ID: 1122
　Use type: method call
　Method call name: super.methodA1("call from ClassB")
　Method call class name: ClassA
Example of information stored regarding an exception catch:
　Class member content ID: 3323 (automatically selected unique number)
　Class member ID: 1122
　Use type: exception catch
　Call name: BBException
　Call class name: Exception The class analysis information registration processing section 21 performs an analyzing process, like the one described above, on all of the designated source files, synthesizes class information, class member information, and class member content information extracted from each source file, and registers them with the class definition information database 22a.

FIGS. 10 through 14 are views showing examples of information created by the above process and stored in the class definition information database 22a.

FIG. 10 is a view showing an example of a class table which stores class information. In this example, extracted information regarding each class is registered. Items registered are Class ID, Class Name, Package Name, Parent Class Name, Parent Class ID, and Scope. To take "ClassB" in the third line as an example, Class ID is "22," Package Name is "co.jp.xxx.aaa.ClassB," Parent Class Name is "ClassA," and Scope is "public." Parent Class ID will be added by a process described later, so information is not stored there now.

FIG. 11 is a view showing an example of a class member table which stores class member information regarding variables. In this example, information regarding the variables "x" and "e" is registered. Items registered include Class Member ID, Class ID, Type, Name, Use Class Name, and Use Class ID. Use Class ID will be added by a process described later, so information is not stored there now.

FIG. 12 is a view showing an example of a class member table which stores class member information regarding methods. In this example, information regarding "methodA1" and "methodB1" is registered. Class Member ID, Class ID, Type, Name, Returned Value Class Name, Returned Value Class ID, Parameter Name, Parameter Class Name, and Parameter Class ID are listed as items registered. Returned Value Class ID and Parameter Class ID will be added by a process described later, so information is not stored there now.

FIG. 13 is a view showing an example of a class member content table which stores class member content information regarding method calls. In this example, information regarding "super.methodA1("call from ClassB")" is registered. Class Member ID, Class ID, Type, Call Name, Use Class Name, and Use Class ID are listed as items registered. Use Class ID will be added by a process described later, so information is not stored there now.

FIG. 14 is a view showing an example of a class member content table which stores class member content information regarding exception catches. In this example, information regarding an exception catch with the call name of "BEException" is registered. Class Member ID, Class ID, Type, Call Name, Parameter Name, Exception Class Name, and Exception Class ID are listed as items registered. Exception Class ID will be added by a process described later, so information is not stored there now.

After class definition information is created in the above way, the class analysis information registration processing section 21 creates class reference information. In this embodiment, the class analysis information registration processing section 21 creates reference information by extracting data corresponding to the blanks in FIGS. 10 through 14 and compiles it. As a result, class reference information is created.

FIG. 15 is a view showing an example of how to store appropriate data in the Parent Class ID fields of the class table shown in FIG. 10. For example, a parent class to "ClassA" does not exist, so its Parent Class ID field is left blank. Parent classes to "ClassB" through "ClassD" are "ClassA" and its Class ID is "11." "11" therefore is stored as their Parent Class ID. Appropriate data is stored in other Parent Class ID fields in the same way.

FIG. 16 is a view showing an example of how to store appropriate data in the Use Class ID fields of the class member table regarding variables shown in FIG. 11. To take the variable "e" as an example, its use class is "ClassEE," so "115" is stored in the Use Class ID field.

FIG. 17 is a view showing an example of how to store appropriate data in the Returned Value Class ID and Parameter Class ID fields of the class member table regarding methods shown in FIG. 12. To take "methodA1" as an example, its returned value class does not exist, so its Returned Value Class ID field is left blank. Its parameter class is "String," so "1" is stored as the corresponding parameter class ID.

FIG. 18 is a view showing an example of how to store appropriate data in the Use Class ID field of the class member content table regarding method calls shown in FIG. 13. With "super.methodA1("call from ClassB")," a use class is "ClassA," so "11" is stored as the corresponding use class ID.

FIG. 19 is a view showing an example of how to store appropriate data in the Exception Class ID field of the class member content table regarding exception catches shown in FIG. 14. With an exception catch with the call name of "BBException," an exception class name is "BBException," so "1111" is stored as the corresponding exception class ID.

Then the class analysis information registration processing section 21 refers to the information created in the above way and extracts reference relationships among classes. Use Type (inheritance, interface, variable, and the like), Use Class, Use Member, Reference Class and Use Name are extracted. The types of information extracted as use relationship detailed information are as follows:

Use of method parameter
Use of method returned value
Use of method exception
Use of method call within method
Use of cast within method
Use of "catch" exception within method To take a concrete example, a table, like the one shown in FIG. 20, will be created as class reference information regarding "ClassB." In this example, Inheritance, Variable, Method Parameter, Method Returned Value, Method Call within Method, and "catch" Exception within Method are extracted as Use Type. Furthermore, Use Class, Use Member, Reference Class, and Use Name are stored for each of them. With Inheritance, for example, "ClassB" inherits from "ClassA." Therefore, "22" which indicates "ClassB," "11" which indicates "ClassA," and "ClassA" are stored as Use Class, Reference Class, and Use Name respectively.

Reference information regarding each class extracted in this way is compiled and stored in the class reference information database 22b. As a result, results obtained by analyzing the source program 20 will be stored in the class definition information database 22a and class reference information database 22b.

Now, the process for searching for a class influenced by a change made in a particular class by referring to information registered with the class definition information database 22a and class reference information database 22b in this way will be described.

Figure 21:
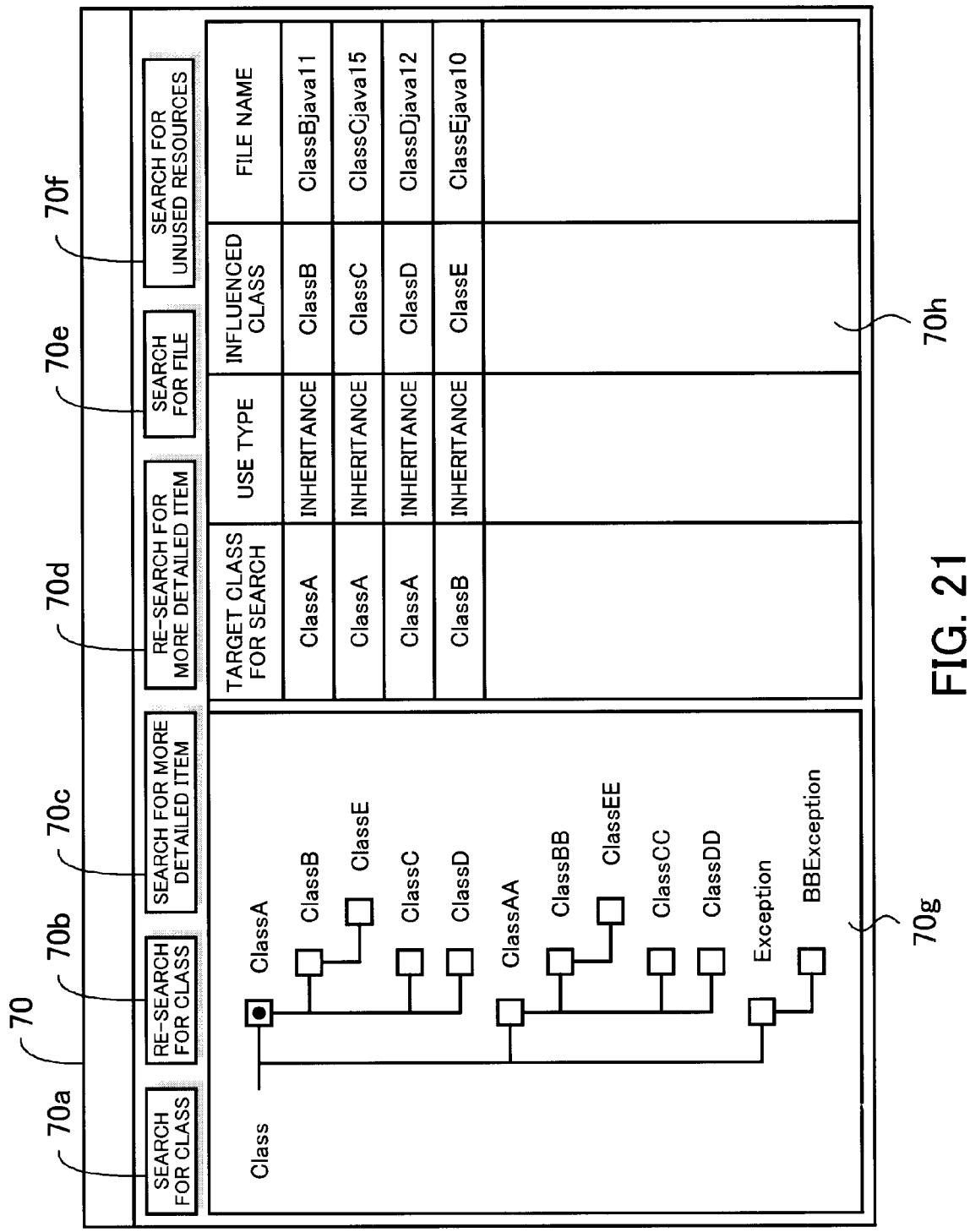
FIG. 21 is a view showing an example of a screen displayed when a class influence search processing section is started.

When the class influence search processing section 23 is started, a screen 70 shown in FIG. 21, for example, will appear on the display device 11. On the screen 70, a button 70a operated to search for a class, a button 70b operated to re-search for a class, a button 70c operated to search for a more detailed item, a button 70d operated to re-search for a more detailed item, a button 70e operated to search for a file, and a button 70f operated to search for unused resources which have not been referred to from any class are displayed. In a display area 70g under these buttons, a tree diagram indicating the hierarchical structure of classes is displayed. Search results are displayed in a display area 70h.

In the display area 70g shown in FIG. 21, it is assumed that a check box displayed to the left of "ClassA" is checked and that the button 70a for searching for a class is operated. Then the class influence search processing section 23 searches the class reference information database 22b for a class using "ClassA." In this example, "ClassB," "ClassC," and "ClassD" inherit from "ClassA," so these are obtained as influenced classes.

If a class obtained has a lower class, then the class influence search processing section 23 makes a search on it in the same way. In this example, "ClassB" has a lower class, so the appropriate "ClassE" will be obtained. Such a process is repeated until an appropriate lower class runs out.

After searching for a class is completed in this way, the class influence search processing section 23 lists search results in the display area 70h shown in FIG. 21. A user can know a class influenced by a change made in "ClassA" by referring to such display.

Figure 22:
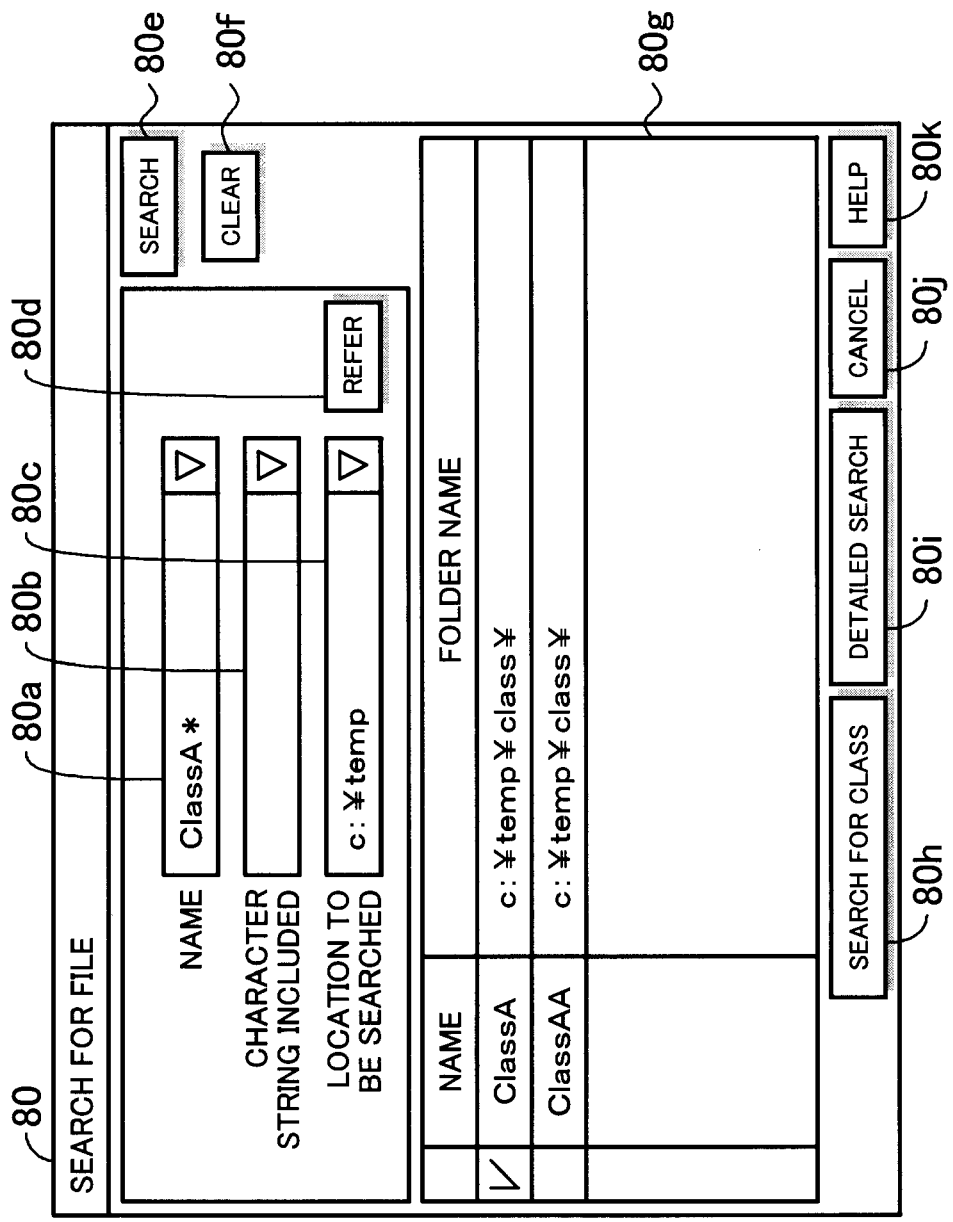
FIG. 22 is a view showing an example of a screen for designating the target class on the basis of a file name.

In the above embodiment, a desired class is designated in a tree diagram. An objective class, however, can be designated from a file name. FIG. 22 is an example of a search screen corresponding to such a case.

On a screen 80, a text box 80a where the name of a file to be searched for is entered, a text box 80b where a character string included in the file is entered, and a text box 80c where a location at which the file is searched for is entered are displayed. A button 80d operated to designate a folder to be searched is displayed to the right of the text box 80c.

A button 80e on the upper right of the screen 80 is operated to make a search under a condition entered. A button 80f is operated to clear a condition entered.

In a display area 80g, search results are listed.

A button 80h is operated to select an item displayed in the display area 80g and to make a search for a class regarding the selected item.

A button 80i is operated to select an item displayed in the display area 80g and to make a detailed search regarding the selected item.

A button 80j is operated to cancel a selection. A button 80k is operated to display a help screen regarding operation etc.

On the screen 80, it is assumed that "ClassA*" is entered in the text box 80a as a name and that "c:¥temp" is entered in the text box 80c as a location to be searched. "*" is a wild card which represents any character or character string. In this state of things, it is assumed that the button 80e is operated. Then the class influence search processing section 23 searches "c:¥temp" for a class including the character string "ClassA*" and lists results obtained in the display area 80g. In this example, "ClassA" and "ClassAA" are displayed as search results.

Subsequently, of check boxes at the extreme left of the display area 80g, the one displayed to the left of "ClassA" is checked. Then the button 80h is operated. By doing so, a class search is made with "ClassA" as a target in the same way that has been described above. As a result, the same contents that are displayed in the display area 70h on the screen 70 shown in FIG. 21 will be displayed.

Figure 23:
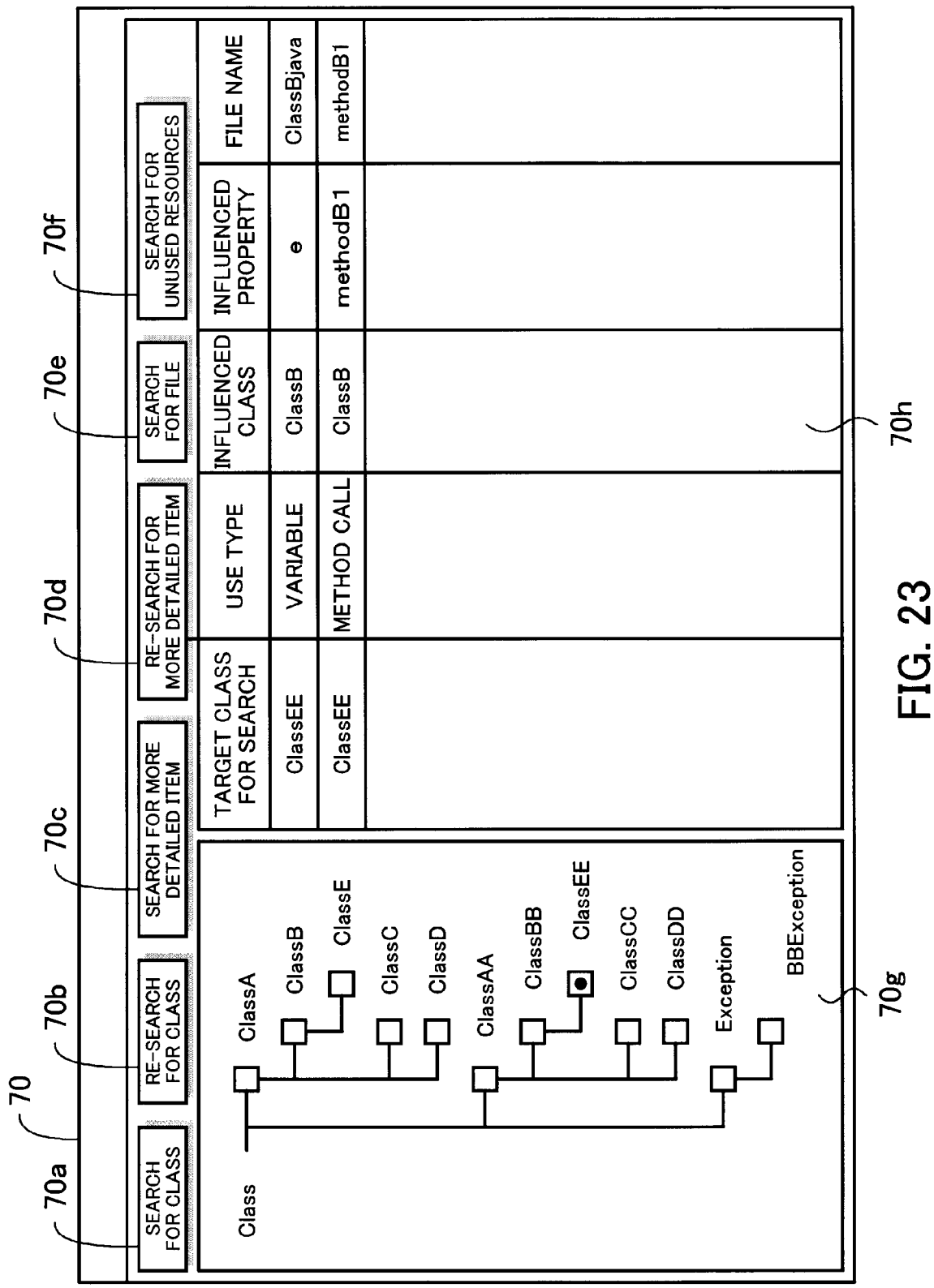
FIG. 23 is a view showing an example of a screen displayed when a class influence search processing section is started.

Next, on a screen 70 shown in FIG. 23, it is assumed that "ClassEE" is selected as a target for a search and that a class search is made. As shown in FIG. 8, "ClassEE" is instantiated in the fourth line of "ClassB" and its method is called in the ninth line. Therefore, a change made in "ClassEE" will influence "ClassB." As a result of the class search, "ClassB" is displayed as Influenced Class and "e" and "methodB1" are displayed as Influenced Property, as shown in the display area 70h in FIG. 23.

By referring to the screen 70, a class and property influenced by a change made in "ClassEE" can be specified.

Now, a method influence search (detailed search) for specifying the extent of influence a change made in a method has will be described. In the display area 70g on the screen 70 shown in FIG. 21, it is assumed that "ClassEE" is selected and that the button 70c is operated. Then a screen 90 shown in FIG. 24 will appear. On the screen 90, methods included in "ClassEE" are listed in a display area 90a.

On the screen 90, it is assumed that "methodEE" displayed in the first line is selected and that a button 90b is operated. Then the class influence search processing section 23 searches the class reference table shown in FIG. 20 for a class influenced by a change made in "methodEE" designated. That is to say, in the class reference table, the class influence search processing section 23 searches for an item Reference Class of which matches the changed class designated, Use Type of which is "method call," and Method Call Name of which is the same. In this example, all of the classes that call "methodEE" of "ClassEE" are specified and the screen 70 indicating search results shown in FIG. 25 will appear. In this example, "ClassB," "methodB1," and "e.methodB1" are displayed in the display area 70h as Influenced Class and Influenced Property influenced by a change made in "methodEE" of "ClassEE" and Call Name, respectively.

By referring such search results, a class and its method influenced by a change made in a method can be specified.

Now, operation performed when the button 70f on the screen 70 shown in FIG. 25 for searching for unused resources is operated will be described.

When the button 70f is operated, the class influence search processing section 23 searches for a class defined in a class table which never once appears under Reference Class in a class reference information table.

Figure 26:
FIG. 26 is a view showing how to judge, by comparing Reference Class in a class reference information table with Class ID in a class table in the case of searching for unused resources, whether or not there is a class ID which never once appears under Reference Class.
Figure 27:
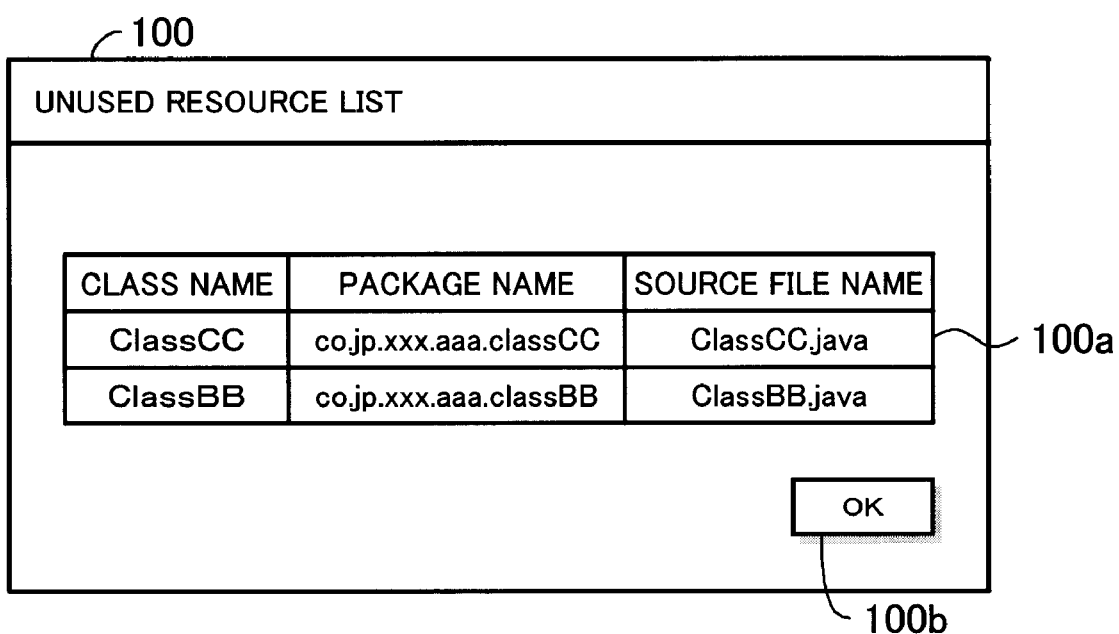

That is to say, as shown in FIG. 26, the class influence search processing section 23 compares Reference Class in a class reference information table with Class ID in a class table and judges whether or not there is a class ID which never once appears under Reference Class. If there is such a class ID, the class influence search processing section 23 obtains the class and displays it on an Unused Resource List screen 100, as shown in FIG. 27.

In this example, "ClassCC" and "ClassBB" are displayed in a display area 10a as unused classes and their package names and source file names are also displayed.

This function enables to specify an unnecessary class, that is to say, a class which has not been referred to from any class and to remove it. As a result, a program will be simplified and the necessary amount of memory etc. will be reduced.

Flow charts performed in the above embodiment will now be described.

Figure 28:
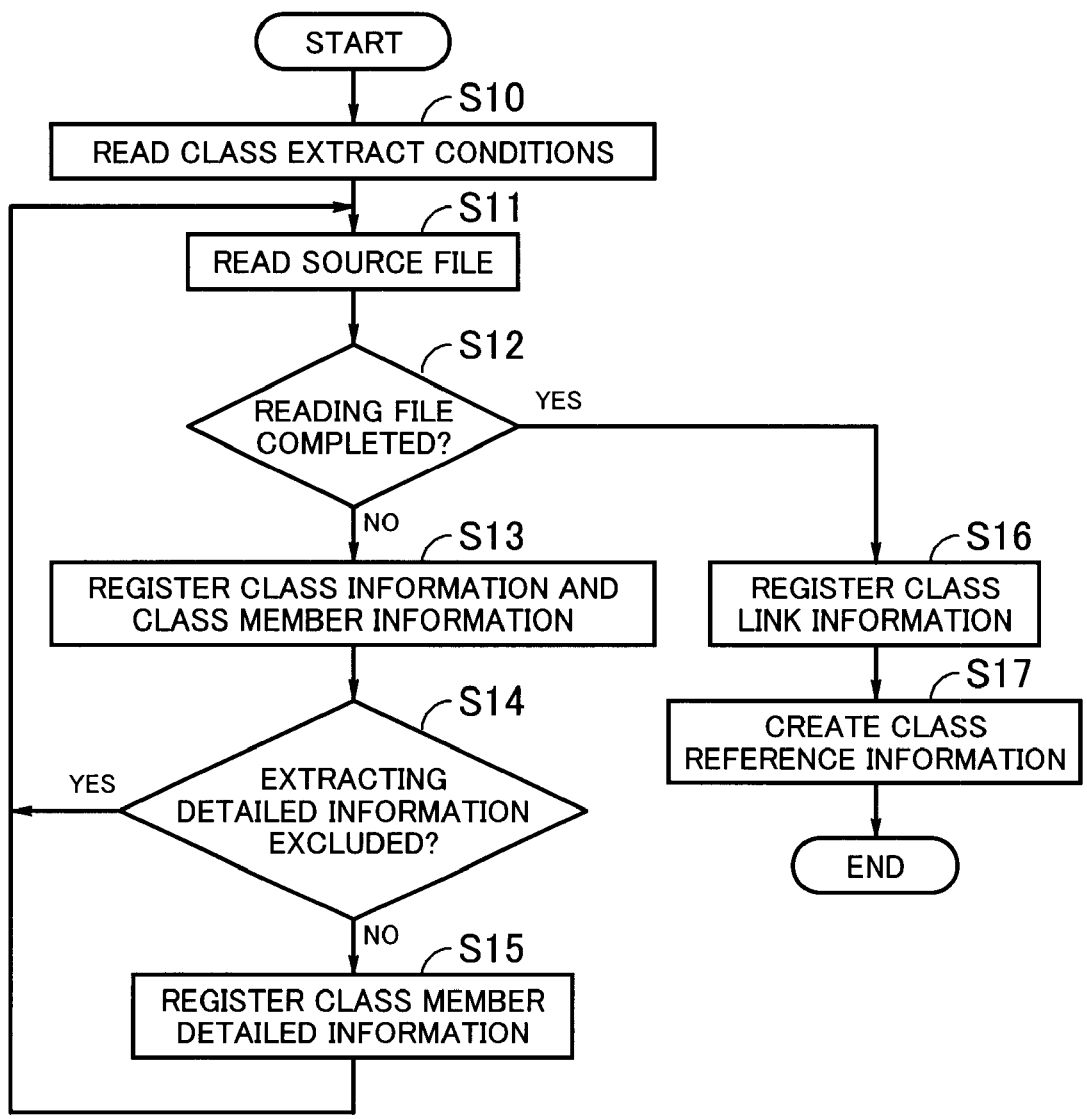
FIG. 28 is an example of a flowchart for analyzing a source file to create class information, class member information, class member detailed information, and class reference information.

FIG. 28 is an example of a flowchart for analyzing a source file to create class information, class member information, class member content information, and class reference information. The following steps will be performed in compliance with this flow chart.

Figure 9:
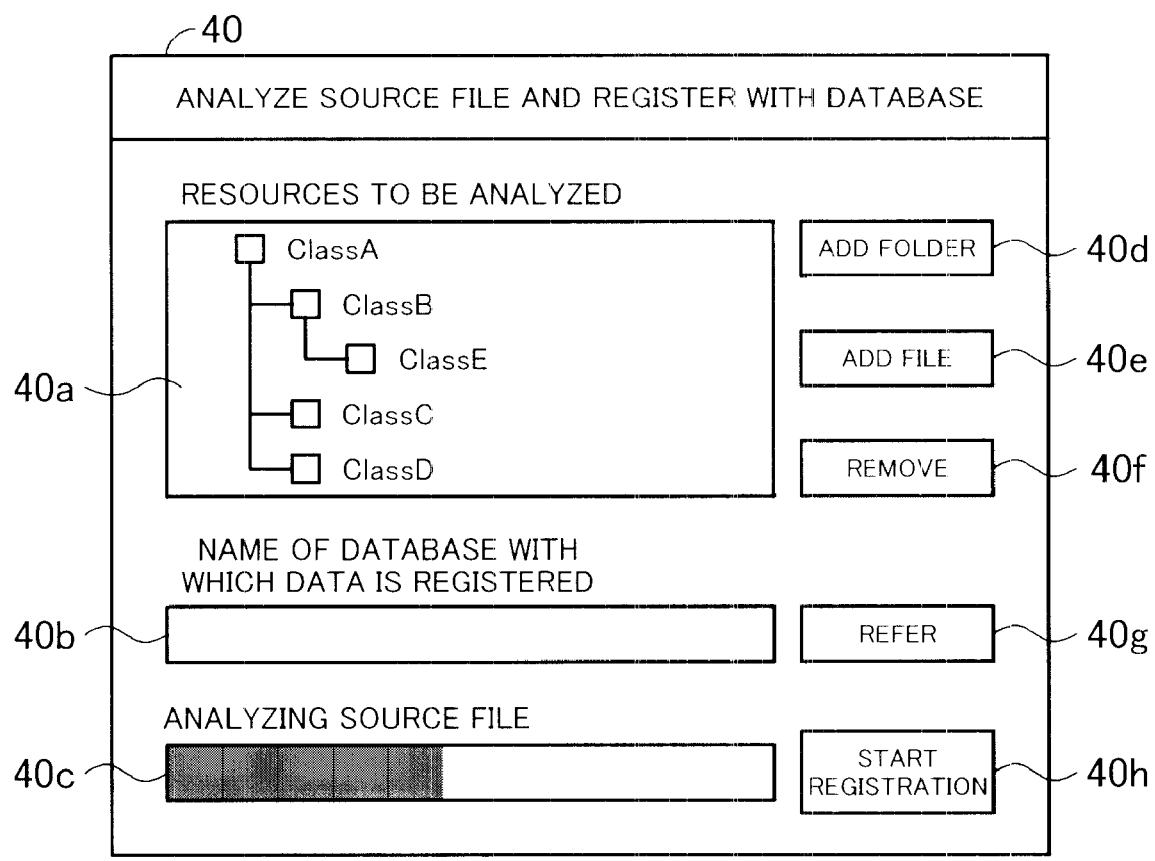
FIG. 9 is an example of a screen for designating a class to be analyzed.

Step S10:

The class analysis information registration processing section 21 reads class extract conditions. Contents entered from the screen 40 shown in FIG. 9 are used as class extract conditions. Alternatively, information may be entered from a file or registry in which extract conditions are described.

Step S11:

The class analysis information registration processing section 21 reads a source file to be analyzed from the HDD 10d.

Step S12:

The class analysis information registration processing section 21 judges whether or not reading the source file is completed. If it is completed, the class analysis information registration processing section 21 proceeds to step S16. If it is not completed, the class analysis information registration processing section 21 proceeds to step S13.

Step S13:

The class analysis information registration processing section 21 extracts class information and class member information from the source file and registers them with the class definition information database 22a in the database 22.

Step S14:

The class analysis information registration processing section 21 judges whether extracting detailed information (class member content information) should be excluded. If extracting detailed information is excluded, the class analysis information registration processing section 21 proceeds to step S11. If extracting detailed information is not excluded, the class analysis information registration processing section 21 proceeds to step S15. To be concrete, if a package does not forward-match the one of which the exclusion is designated, the class analysis information registration processing section 21 proceeds to step S15.

Step S15:

The class analysis information registration processing section 21 extracts class member detailed information, registers it with the class definition information database 22a, and returns to step S11 to repeat the same process that has been described above.

Step S16:

The class analysis information registration processing section 21 registers class link information by linking all the relationships of referring to each class.

Step S17:

The class analysis information registration processing section 21 refers to links it registered in step S16, creates class reference information, and registers the information with the class reference information database 22b.

Figure 29:
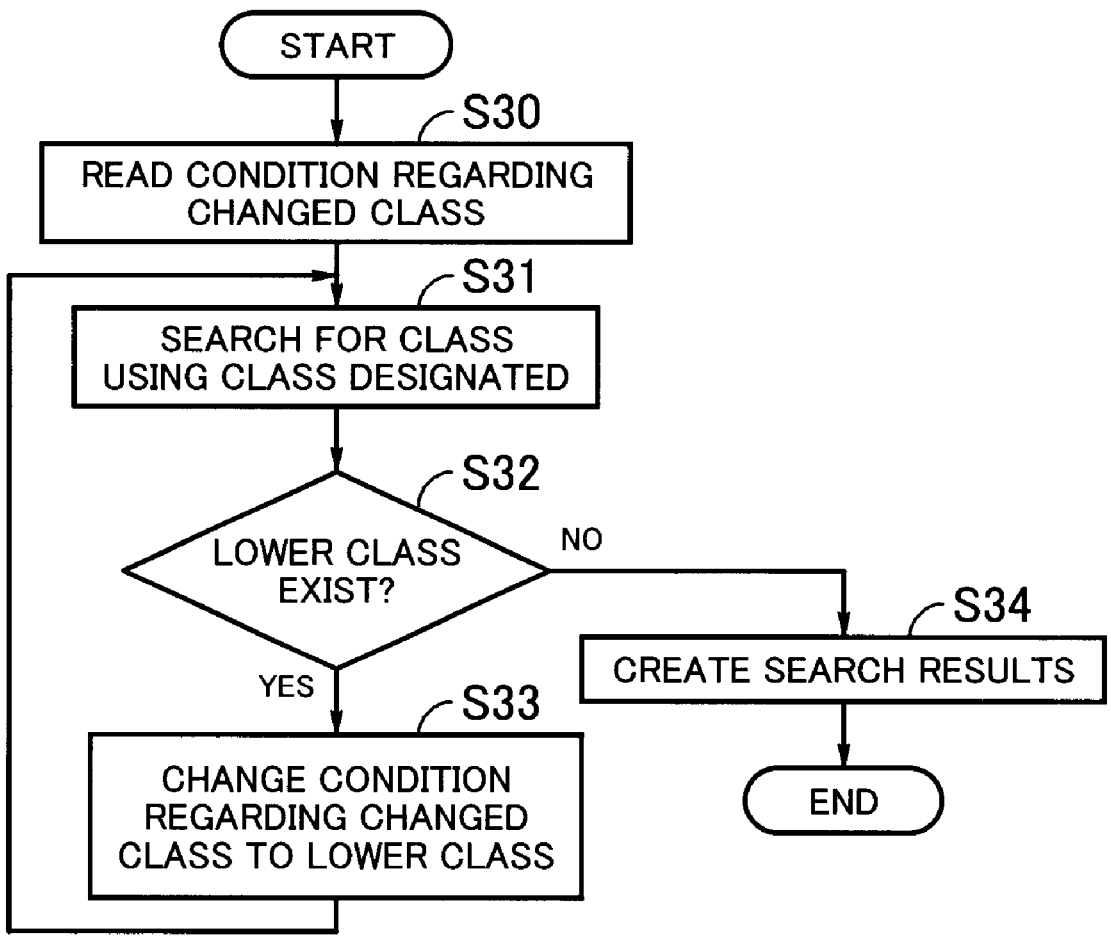
FIG. 29 is an example of a flowchart performed when a class influence search is made.

Now, a flowchart performed when a class influence search is made will be described with reference to FIG. 29. The following steps will be performed in compliance with this flow chart.

Step S30:

The class influence search processing section 23 reads a condition regarding a changed class entered on the screen 70 shown in FIG. 21.

Step S31:

The class influence search processing section 23 searches the class reference information database 22b for a class using the class designated in step S30.

Step S32:

The class influence search processing section 23 judges whether or not a class obtained has a lower class. If there is a lower class, the class influence search processing section 23 proceeds to step S33. If there is no lower class, the class influence search processing section 23 proceeds to step S34.

Step S33:

The class influence search processing section 23 changes the condition regarding a changed class, that is to say, the class to be searched for to the lower class specified in step S32.

Step S34:

The class influence search processing section 23 creates search results and displays them in, for example, the display area 70h shown in FIG. 21.

Figure 30:
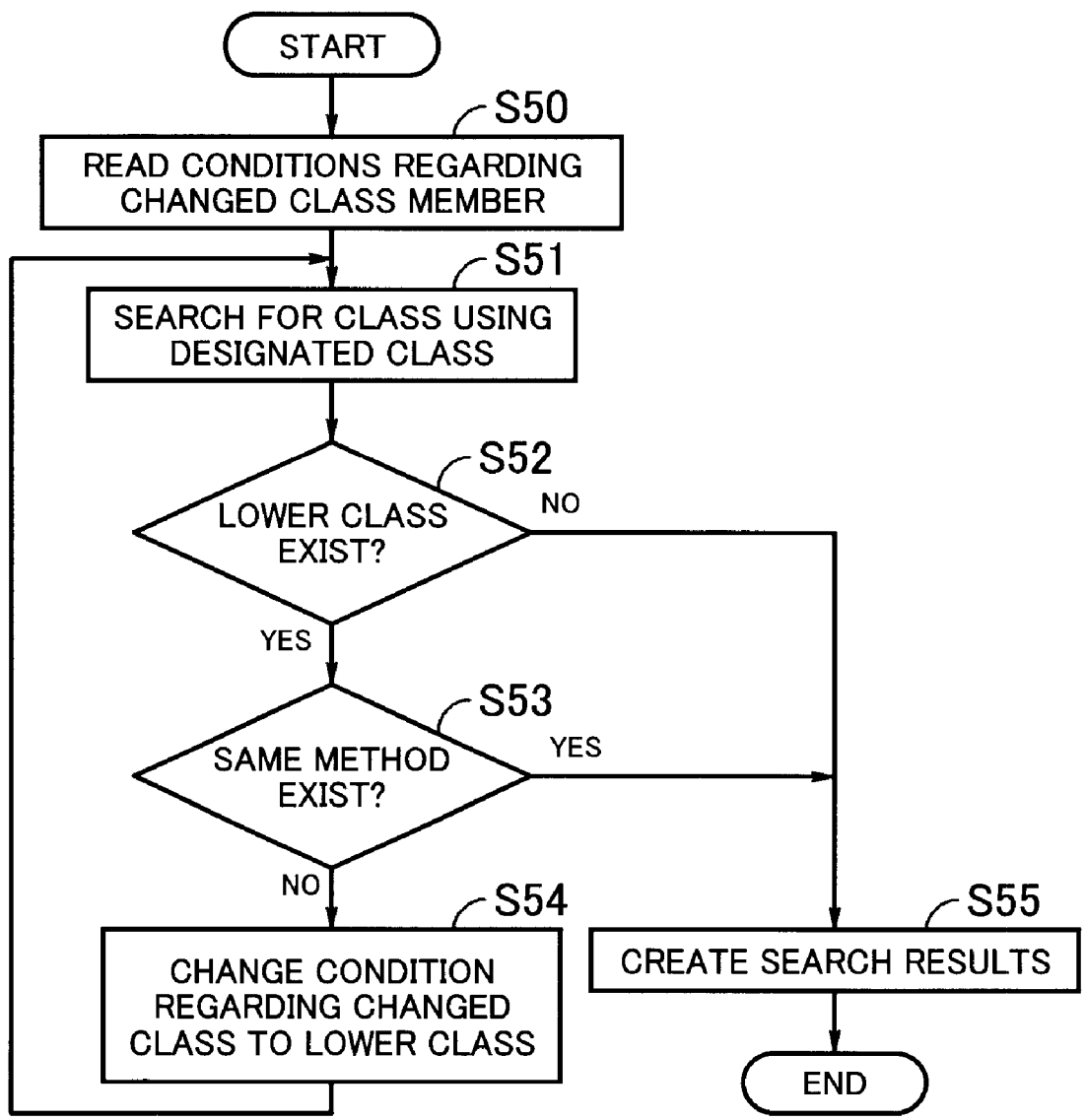
FIG. 30 is an example of a flowchart performed when a method influence search is made.

Now, a flowchart performed when a method influence search is made will be described with reference to FIG. 30. The following steps will be performed in compliance with this flow chart.

Step S50:

The class influence search processing section 23 reads a member to be changed and its class from, for example, the screen 90 shown in FIG. 24 as conditions regarding a changed class member.

Step S51:

The class influence search processing section 23 searches the class reference information database 22b for a class using the designated class by a method call which matches the designated conditions.

Step S52:

The class influence search processing section 23 judges whether or not the class designated has a lower class. If there is a lower class, the class influence search processing section 23 proceeds to step S53. If there is no lower class, the class influence search processing section 23 proceeds to step S55.

Step S53:

The class influence search processing section 23 judges whether or not the lower class specified in step S52 has the same method. If the same method (with the same name and parameter) exists, that is to say, if there is an override, the class influence search processing section 23 proceeds to step S55. If the same method does not exist, the class influence search processing section 23 proceeds to step S54.

Step S54:

The class influence search processing section 23 changes the condition regarding a changed class to the lower class and returns to step S51 to repeat the same process that has been described above. As a result, the same process will be repeated until a subclass runs out.

Figure 25:
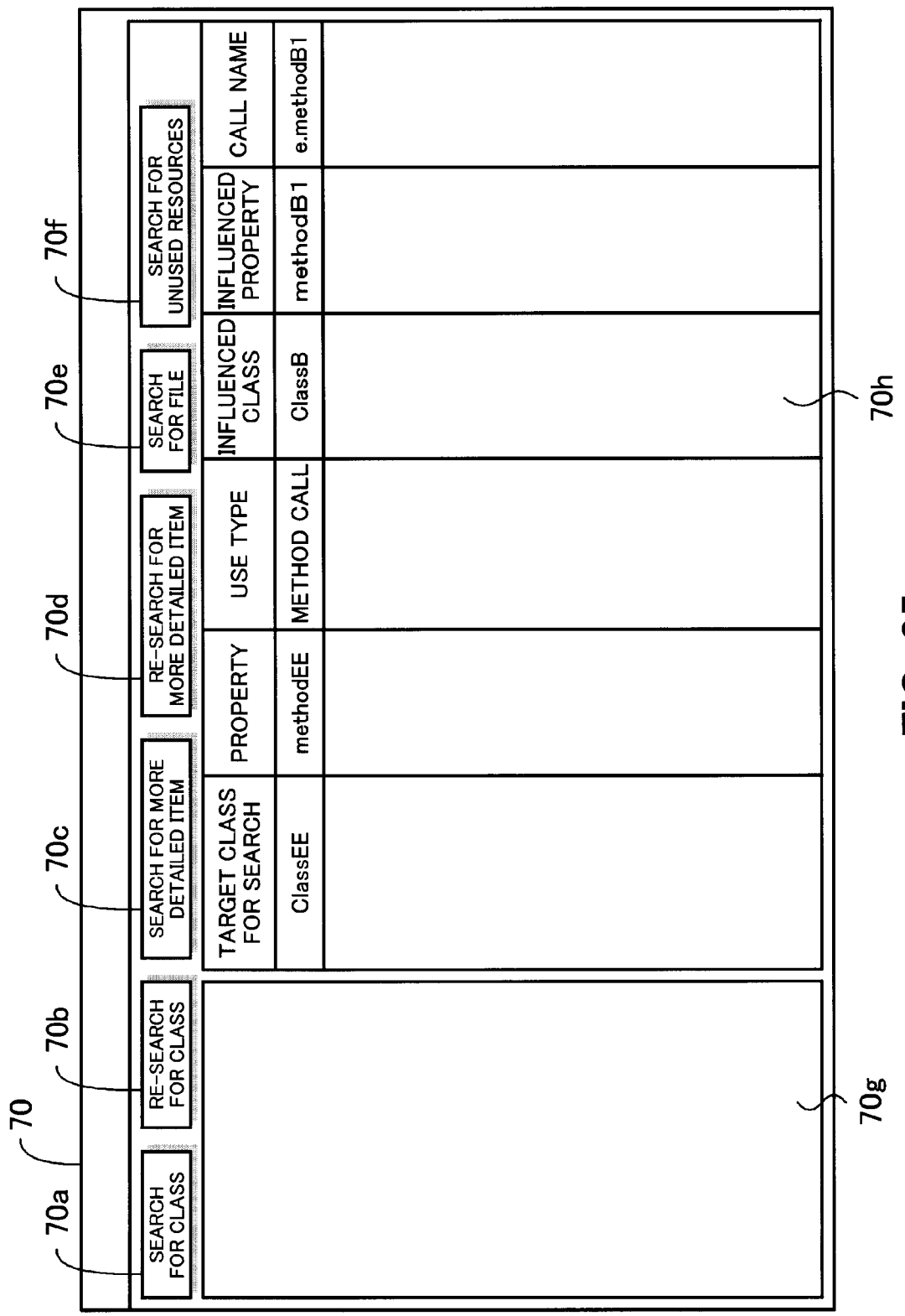
FIG. 25 is an example of a screen displayed when a button 90b shown in FIG. 24 is operated.

Step S55:

The class influence search processing section 23 creates search results and displays them on, for example, the screen 70 shown in FIG. 25.

Figure 31:
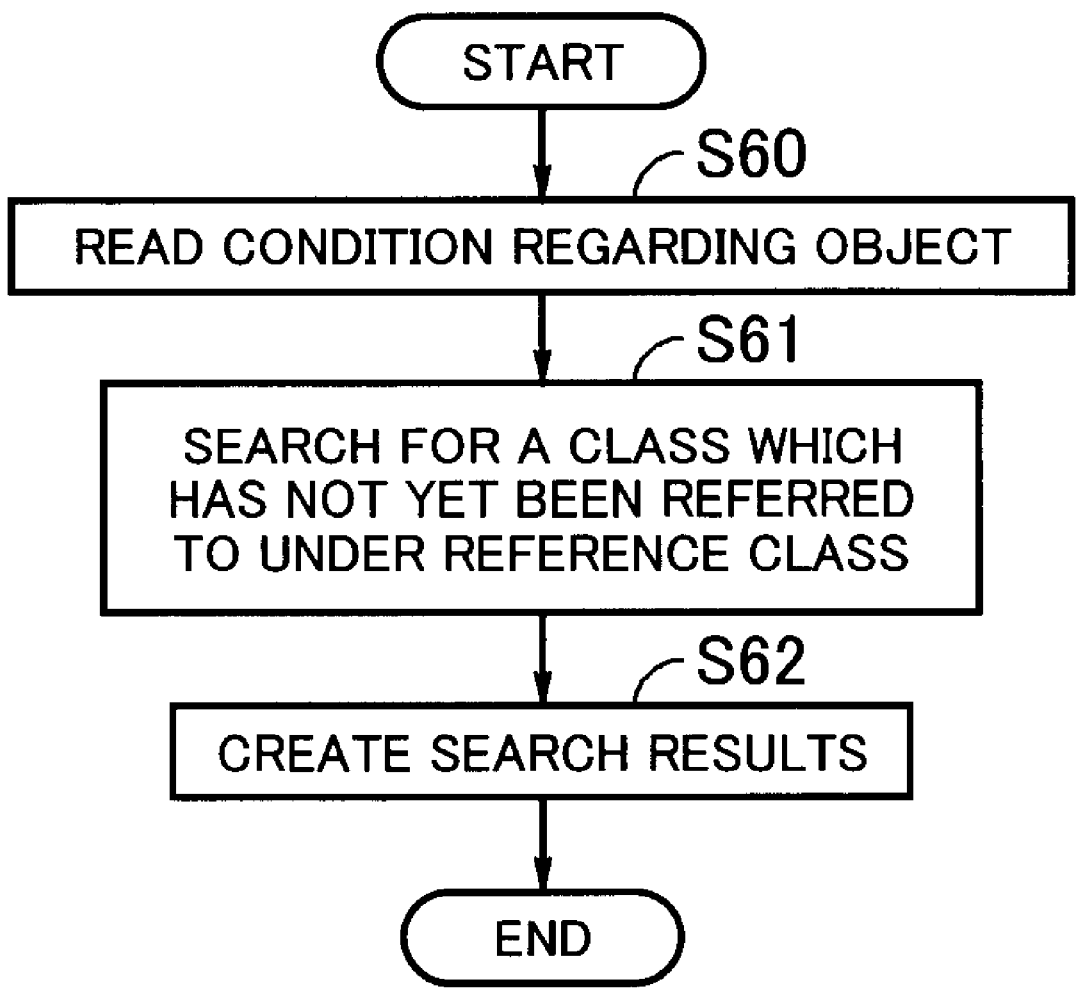
Figures 32A, 32B:
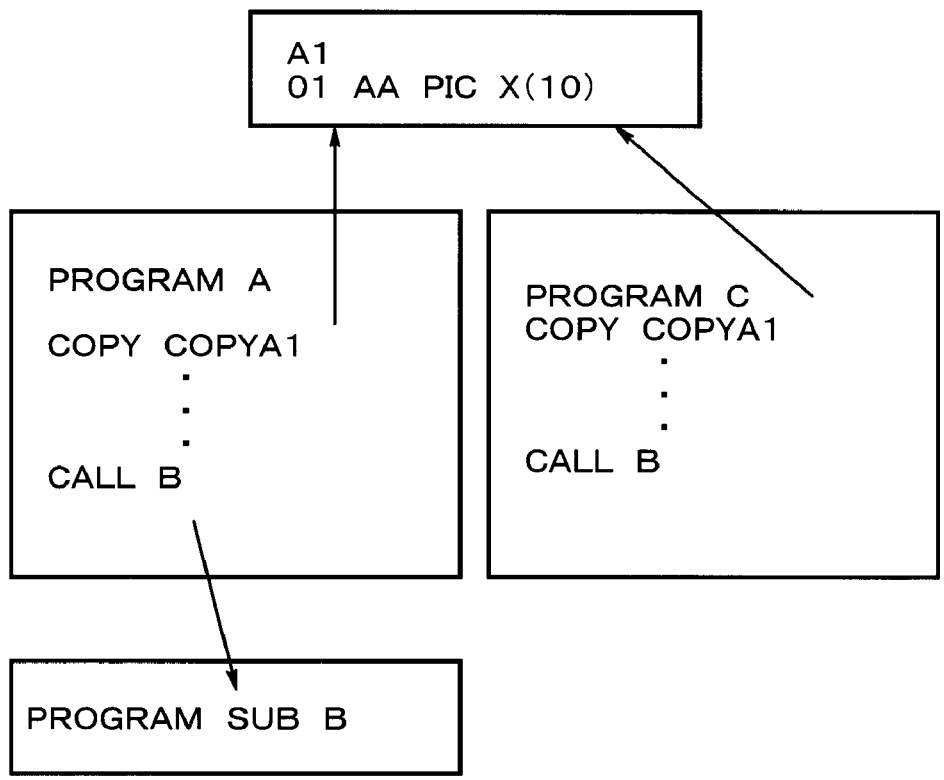
FIGS. 32(A) and 32(B) are views for describing an influence search function called cross reference which has conventionally been used to specify a portion influenced by a change made in a source file, FIG. 32(A) being a view showing a source file to be changed, FIG. 32(B) being a view showing the results of an influence search.

A flowchart performed when unused resources are searched for will now be described with reference to FIG. 31. The following steps will be performed in compliance with this flow chart.

Step S60:

The class influence search processing section 23 receives a condition regarding an object of a search. To be concrete, the class influence search processing section 23 has a package to be searched for designated.

Step S61:

The class influence search processing section 23 searches for a class which has not yet been referred to under Reference Class.

Step S62:

The class influence search processing section 23 creates search results and displays them on, for example, the screen 100 shown in FIG. 27.

The procedures shown in FIGS. 28 through 31 will enable to realize the functions performed in the embodiment shown in FIG. 3.

The above embodiment has been described with JAVA as an example of an object-oriented language, but the present invention is applicable to other object-oriented languages.

Furthermore, the above embodiment is a simple example. The present invention is not limited only to such a case, of course.

The above procedure can be achieved with a computer. In that case, the contents of a function which a source file analyzing apparatus must have are described in a program recorded on a record medium which can be read with a computer. The above procedure is achieved with a computer by executing this program on the computer. A record medium which can be read with a computer can be a magnetic recording medium, a semiconductor memory, or the like. In order to place this program on the market, it can be stored on a portable record medium, such as a compact disk read only memory (CD-ROM) or a floppy disk. Alternatively, it can be stored in a memory of a computer connected via a network and be transferred to another computer via a network. When this program is executed on a computer, it is stored on a hard disk etc. in the computer and is loaded into a main memory.

As described above, a computer-readable record medium recording a computer program for performing the process of analyzing a source file described in an object-oriented language, according to the present invention, has a computer function as inputting means for inputting a source file to be analyzed, reference relationship examining means for examining the reference relationships of classes included in a source file input by the inputting means, and influenced class specifying means for specifying a class influenced by a change made in a predetermined class on the basis of the results of examinations by the reference relationship examining means. Therefore, a class influenced by a change made in a predetermined class included in a source file described in an object-oriented language can be specified easily.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable record medium recording a computer program for performing the process of analyzing a source file described in an object-oriented language, the program comprising the functions of:

inputting means for inputting a source file to be analyzed;

reference relationship examining means for examining the reference relationships of classes included in the source file input by the inputting means; and influenced class specifying means for specifying a class influenced by a change made in a predetermined class on the basis of results obtained through examinations by the reference relationship examining means, wherein the reference relationship examining means creates examination result information including class definition information regarding the contents of class definitions and class reference information regarding the reference relationships of classes according to the results of examinations regarding the reference relationships of classes, and wherein the influenced class specifying means specifies an influenced class by referring to the class reference information of the examination result information.

2. The record medium according to claim 1, wherein the class definition information includes class information regarding class definitions, class member information regarding class member definitions, and class member content information regarding the contents of class members; and the influenced class specifying means specifies an influenced class by selecting necessary information from among the class information, the class member information, and the class member content information according to a class to be searched for.

3. The record medium according to claim 1, wherein the reference relationship examining means creates the class definition information and the class reference information according to databases after analysis according to source files.

4. The record medium according to claim 1, wherein the influenced class specifying means specifies, by searching for lower classes in turn which have a reference relationship with a class to be changed, whether the lower classes are influenced by the change.

5. The record medium according to claim 1, wherein the influenced class specifying means specifies a class influenced by a change made in a predetermined class member.

6. The record medium according to claim 1, further comprising unused class detecting means for detecting an unused class which has not been referred to from other classes by referring to results obtained through examinations by the reference relationship examining means.

7. A source file analyzing method for analyzing a source file described in an object-oriented language, the method comprising:

an inputting step for inputting a source file to be analyzed;

a reference relationship examining step for examining the reference relationships of classes included in a source file input by the inputting step; and an influenced class specifying step for specifying a class influenced by a change made in a predetermined class on the basis of results obtained through examinations by the reference relationship examining step, wherein the reference relationship examining step creates examination result information including class definition information regarding the contents of class definitions and class reference information regarding the reference relationships of classes according to the results of examinations regarding the reference relationships of classes, and wherein the influenced class specifying step specifies an influenced class by referring to the class reference information of the examination result information.

8. The method according to claim 7, wherein the class definition information includes class information regarding class definitions, class member information regarding class member definitions, and class member content information regarding the contents of class members; and the influenced class specifying step specifies an influenced class by selecting necessary information from among the class information, the class member information, and the class member content information according to a class to be searched for.

9. The method according to claim 7, wherein the reference relationship examining step creates the class definition information and the class reference information according to databases after analysis according to source files.

10. The method according to claim 7, wherein the influenced class specifying step specifies, by searching for lower classes in turn which have a reference relationship with a class to be changed, whether the lower classes are influenced by the change.

11. The method according to claim 7, wherein the influenced class specifying step specifies a class influenced by a change made in a predetermined class member.

12. The method according to claim 7, further comprising unused class detecting step for detecting an unused class which has not been referred to from other classes by referring to results obtained through examinations by the reference relationship examining means.

* * * * *